June 5, 1928.                    C. A. NEGLEY                    1,672,421
                                 GREASE GUN
                              Filed May 6, 1927            2 Sheets-Sheet  2
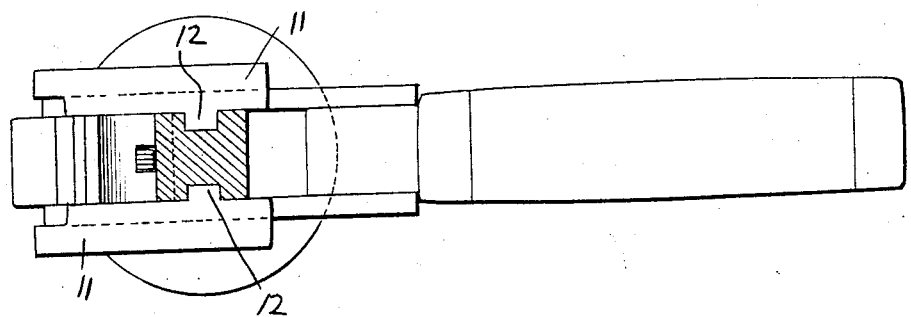
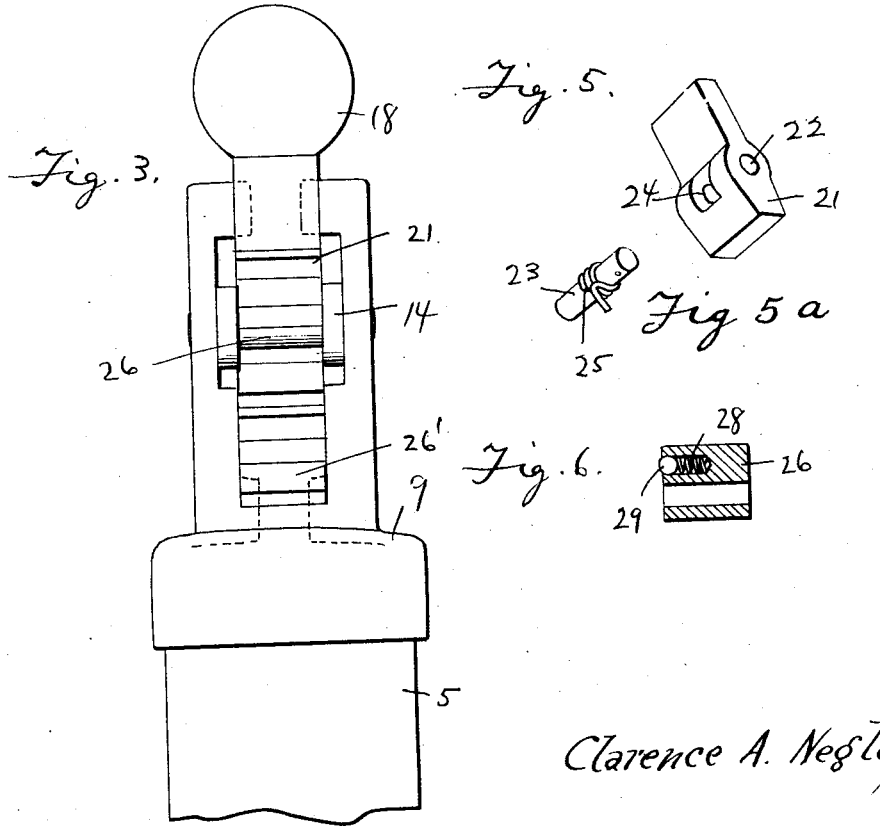

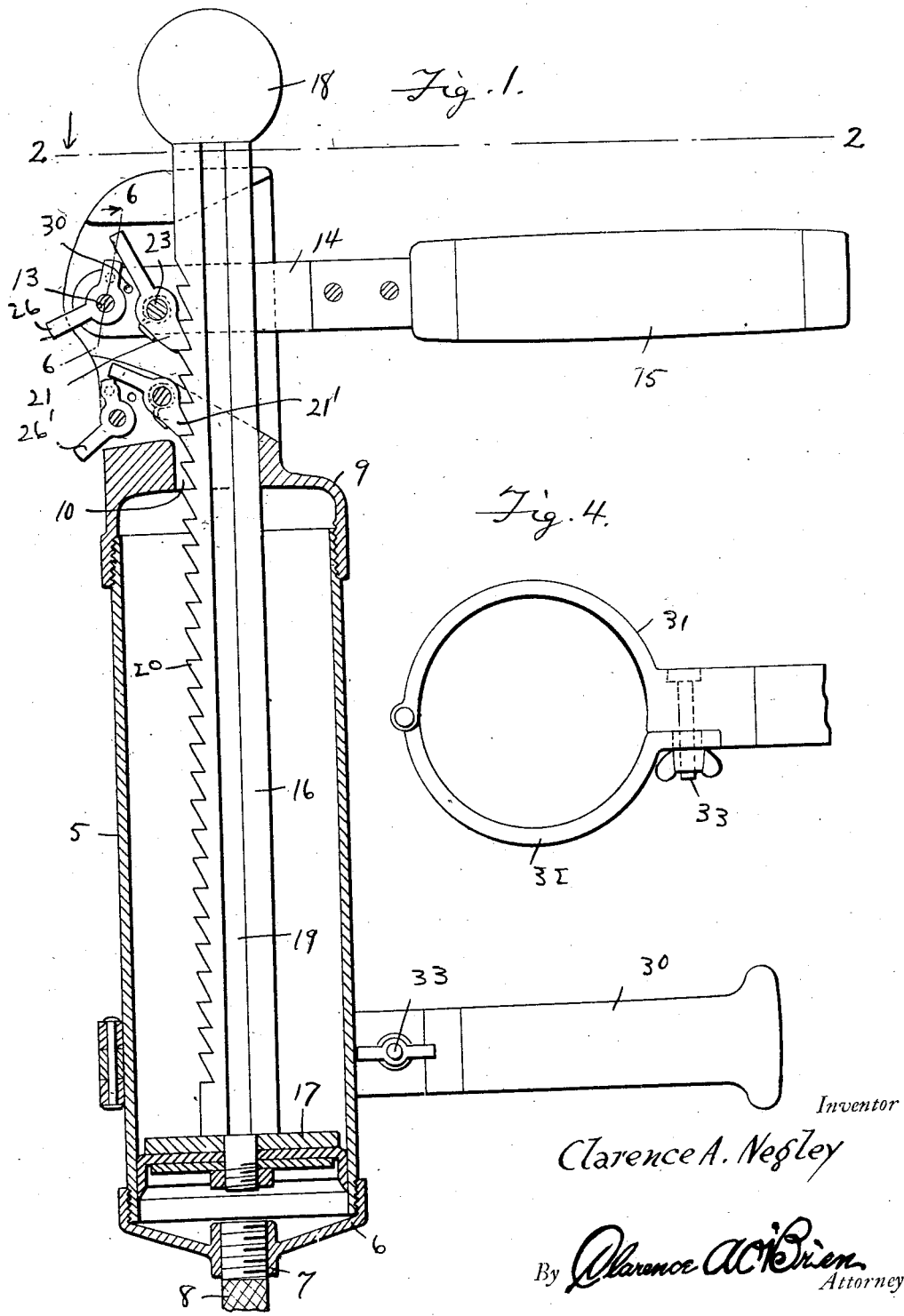

Patented June 5, 1928.

1,672,421

UNITED STATES PATENT OFFICE.

CLARENCE A. NEGLEY, OF LARNED, KANSAS.

GREASE GUN.

Application filed May 6, 1927. Serial No. 189,307.

This invention relates to new and useful improvements in grease guns and aims to provide means for facilitating the easy and rapid discharge of the grease from the gun and this without requiring great exertion on the part of the operator as is now the case in grease guns of the screw follower type generally in use.

In carrying out my invention there is provided a grease cylinder having a discharge pipe at one end and within which is rectilinearly movable a pressure piston, the same being operatively associated with a handle lever at the outer end of the cylinder in such a manner as to permit of the easy downward movement of the cylinder and this in a quick and unexhausted manner.

A most important object of the invention resides in the provision of a grease gun of the aforementioned character that is relatively simple of construction and inexpensive of manufacture, the same including but few parts and these so correlated as to lessen the possibility of disarrangement to a minimum.

In the drawings wherein like reference characters indicate corresponding parts:

Figure 1 is a detail longitudinal section through my improved grease gun.

Figure 2 is a horizontal section taken substantially upon the line 2—2 of Figure 1 and looking downwardly in the direction of the arrows.

Figure 3 is a rear elevation of the upper end of the gun.

Figure 4 is a fragmentary top plan of a gripping and steadying handle constructed for detachable association with the body of the gun.

Figure 5 is a perspective of one of the piston rod locking dogs.

Figure 5ª is the pivot pin for the locking dog of Figure 5, and

Figure 6 is a section taken on the line 6—6 of Figure 1 through the releasing unit complemental to the adjacent dog and being equipped to facilitate its retention in dog releasing position.

Now having particular reference to the drawing, my novel grease gun consists of a cylindrical grease container 5 of predetermined capacity open at its opposite end and externally screw threaded at said ends as clearly indicated in Figure 1. Arranged upon the lower end of said cylinder 5 is a cap 6 formed centrally with a threaded sleeve 7 within which is threaded one end of a flexible grease hose 8. Threaded upon the opposite end of the cylinder 5 is a cap 9 formed centrally with a square shaped opening 10 and extending upwardly from which is a pair of spaced tongues 11—11, the opposed faces of which are formed with vertical ribs 12—12.

Pivoted between these tongues 11—11 as at 13 is the inner bifurcated end 14 of a handle lever 15 through the branches of which bifurcation extends a square shaped piston rod 16 movable through the opening 10 in the cap 9 and upon the lower end of which is mounted a suitable piston 17, rectilinearly movable within the cylinder 5.

As clearly indicated in Figures 1 and 3, the upper end of the piston rod 16 is equipped with a suitable handle 18 to facilitate the raising of the same and consequently the piston 17 within the cylinder 5. The sides of this piston rod 16 are formed with longitudinal channels 19 within which are arranged the ribs 12—12 of the said spaced tongues 11—11 for guiding the piston rod in its vertical reverse movement. Furthermore, the inner edge of the piston rod 16 is formed with teeth 20, while pivoted between the branches of the bifurcation 14 of the handle lever 15 between the pivot 13 and said tooth edge of the piston rod 16 is a ratchet dog 21 preferably of the character as indicated in Figure 5. This dog 21 is formed with a longitudinal pivot pin opening 22 through which the pivot pin 23 is arranged. The opposite end thereof being suitably arranged within openings in the branches of the handle lever bifurcations 14. The said dog 21 is formed centrally of the pivot pin opening 22 with an opening 24, while surrounding the pivot pin 23 at its center is a coil spring 25, one end of which is attached to the pin, while the opposite end thereof is bent outwardly from engaging the outer face of the dog 21 so as to cause the inward swinging movement of the lower end thereof for maintaining the same in normal engagement with the teeth 20 so that when the handle 15 is swung downwardly a consequent downward movement of the piston rod 16 and piston 17 will be brought about.

In order to maintain the dog 21 out of engagement with the teeth 20 there is arranged upon the lever pivot pin 13 a bell crank thumb lever 26, the inner arm of which has contact with the end of the dog 21 above its pivot 23 so that when said lever is swung upwardly, the dog 21 will be swung out of engagement with said teeth.

The inner arm of the bell crank thumb lever 26 is formed at one edge with a horizontal socket 28 within which is arranged a spring pressed ball 29 at all times maintained partially projecting from the surface of the bell crank and adapted for engagement within a circular depression 30 in the face of the adjacent branch of the handle lever bifurcation 14 for obviously locking the bell crank in dog released position.

Pivotally arranged between the tongues 11—11 of the cylinder cap 8 beneath the dog 21 and bell crank thumb lever 26 are similar dogs 21' and 26' of identical construction to that of said dog 21 and bell crank 26. The dog 21' is for the purpose of preventing the upward movement of the piston 17 and rod 16 during the lifting action of the lever 15. The bell crank thumb lever 26' is for the purpose of maintaining the dog 21' out of engagement with the teeth of the rod 16 so that when the dog 21 is released, the rod and piston may be raised.

The invention further consists of a handle for the cylinder 5 consisting of a handle bar 30 upon the inner end of which is one section 31 of a circular clamp, and to the outer end of which is pivotally attached the other section 32, said section adapted to be secured in rigid position around the cylinder 5 by a bolt and nut connection 33.

It will thus be seen that I have provided a highly novel, simple, and efficiently operating grease gun that is well adapted for all the purposes heretofore designated and even though I have herein shown and described the invention as consisting of certain detail structural units it is nevertheless to be understood that some changes may be made therein without affecting the spirit and scope of the appended claims.

Having thus described the invention, what I claim as new and desire to secure by Letters Patent is:—

1. In a grease gun of the class described, a cylinder adapted to contain the grease, said cylinder being provided at one end with discharge means, a cap fitted upon the opposite end of the cylinder, said cap having a central opening and carrying integral outstanding tongues located on opposite sides of said opening, said tongues being spaced apart in parallelism and including opposed ribs, a plunger including a stem, said plunger being slidable in said cylinder and the stem extending outwardly through the opening in said cap and between said tongues, said stem having grooves receiving said ribs, a lever having a bifurcated end portion, the furcations straddling said stem and being pivotally mounted between said tongues, said plunger being provided along one side with the rack teeth, and a pawl pivotally mounted between said furcations and engageable with said teeth.

2. In a grease gun of the class described, a cylinder adapted to contain the grease, said cylinder being provided at one end with discharge means, a cap fitted upon the opposite end of the cylinder, said cap having a central opening and carrying integral outstanding tongues located on opposite sides of said opening, said tongues being spaced apart in parallelism and including opposed ribs, a plunger including a stem, said plunger being slidable in said cylinder and the stem extending outwardly through the opening in said cap and between said tongues, said stem having grooves receiving said ribs, a lever having a bifurcated end portion, the furcations straddling said stem and being pivotally mounted between said tongues, said plunger being provided along one side with the rack teeth, a pawl pivotally mounted between said furcations and engageable with said teeth, an additional and independent pawl pivotally mounted between said tongues and also engageable with said teeth, and releasing means for said additional pawl also carried by said tongues.

In testimony whereof I affix my signature.

CLARENCE A. NEGLEY.